United States Patent [19]

Doolan et al.

[11] Patent Number: 5,425,806
[45] Date of Patent: Jun. 20, 1995

[54] POURABLE WATER DISPERSIBLE THICKENING COMPOSITION FOR AQUEOUS SYSTEMS AND A METHOD OF THICKENING SAID AQUEOUS SYSTEMS

[75] Inventors: Joseph G. Doolan, Hightstown; Charles A. Cody, Robbinsville, both of N.J.

[73] Assignee: Rheox, Inc., Hightstown, N.J.

[21] Appl. No.: 242,747

[22] Filed: May 12, 1994

[51] Int. Cl.⁶ .................. C09D 7/12; C09D 101/28
[52] U.S. Cl. ............................ 106/203; 106/199; 524/1; 524/117; 524/156; 524/157
[58] Field of Search .............. 106/199, 203; 524/1, 524/117, 156, 157

[56] References Cited

U.S. PATENT DOCUMENTS 5,376,709 12/1994 Lau .

FOREIGN PATENT DOCUMENTS 60-49022 3/1985 Japan .

OTHER PUBLICATIONS (Jan. 1, 1989) Commercial Brochure-AKZO Entitled "Thickening With Dapral T210 and T212".
Paper Given by Ma & Glass of North Dakota State University at the 206th American Chemical Society Meeting the week of (Aug. 21-27, 1993) in Chicago entitled "Complexations of p-Cyclodextrin with Surfactants and Hydrophobically-modified Water-soluble Polymers: Analytical Application in Adsorption Measurements".

*Primary Examiner*—David Brunsman
*Attorney, Agent, or Firm*—Michael J. Cronin

[57] ABSTRACT

A pourable liquid thickening composition for aqueous systems including latex coatings is described. The composition comprises in specified ratios an associative thickener polymer, water and one or more surfactants. Associate thickener polymers include polyurethanes, polyesters, polyacrylamides, modified hydroxyethyl celluloses, alkali soluble emulsions and other chemicals. Specific surfactants include dialkyl sulfosuccinates, alkyl sulfates, alpha olefin sulfonates and sulfates of ethoxylated alcohols.

12 Claims, No Drawings

POURABLE WATER DISPERSIBLE THICKENING COMPOSITION FOR AQUEOUS SYSTEMS AND A METHOD OF THICKENING SAID AQUEOUS SYSTEMS

BACKGROUND OF THE INVENTION

1. Brief Description of the Invention

The present invention relates to improved thickening compositions, often referred to as theological additives, used to provide viscosity control and other rheological properties to aqueous systems. In many commercial theological additives, an active thickening chemical such as a polyurethane polymer is mixed with water and a volatile organic liquid to provide users with a pourable, liquid, thickening composition which can be conveniently added to aqueous systems. The present invention involves the substantial elimination of the volatile organic liquid component and its replacement with a non-volatile component, resulting in a thickening composition with equal or improved viscosity properties and with no, or with substantially diminished volatile organic content, thus having a positive impact on the environment.

2. Description of the Prior Art

It has long been known in the art to use various materials as thickening compositions to thicken aqueous systems. Aqueous systems include both water-based and latex-based paints, coatings, inks, construction materials, cosmetics, and wood stains utilized in various aspects of a civilized industrial society. Depending on the composition of the aqueous system the products made with these thickeners can be useful as decorative and protective coatings, paper coatings, cosmetics and personal care items, adhesives and sealants, inks, petroleum drilling fluids, joint compounds, and the like.

Many thickeners are known, natural, modified—natural and synthetic. Natural thickeners, for instance, include casein and alginates. Modified—natural thickeners include modified celluloses, including methyl cellulose, hydroxyethyl cellulose, hydroxypropyl cellulose, and carboxymethyl cellulose. These products vary in their thickening efficiency and flow and leveling properties.

Synthetic thickeners in recent years have assumed increased importance, particularly in the viscosity control of aqueous and latex paints and coatings. The synthetic thickener serves several roles in aqueous systems. In latex and aqueous paints and coatings, for instance, the thickener provides improved stability and pigment suspension, and improved application properties. In cosmetics and personal care items, the thickener improves body, feel, smoothness and silkiness, making the product more aesthetically pleasing. In petroleum drilling fluids, the use of a thickener improves the suspension of the cuttings, thereby increasing the efficiency with which the cuttings can be removed from the deep bore holes encountered in drilling, thereby extending the life of the drill bit.

Synthetic rheological thickeners include various acrylic polymers and maleic anhydride copolymers. Two patents issued to RHEOX Inc., a subsidiary of NL Industries, Inc., describe a family of polyurethane thickening compositions sold under the commercial designations RHEOLATE 244, RHEOLATE 255 and RHEOLATE 278. These patents, U.S. Patent Nos. 4,499,233 and 5,023,309 describe these synthetic thickeners as the polyurethane reaction product of polyisocyanates, polyether polyols, modifying agents which contain at least two active hydrogen moieties, terminated by a chemical capping agent.

One type of synthetic thickener used extensively in commercial applications is a low molecular weight polyurethane characterized by hydrophobic groups interconnected by hydrophilic polyether groups, and is disclosed in Rohm & Haas U.S. Pat. Nos. 4,079,028 and 4,155,892. Typically these materials have molecular weights of 2500 grams/mole or higher. The polyurethane is described as prepared by reacting at least one water soluble polyether polyol with at least one monofunctional hydrophobic organic compound. There are also present in the reaction mixture insoluble organic polyisocyanates, or polyhydric alcohol, or polyhydric alcohol ethers.

One similar type of synthetic thickener is a water-soluble, thermoplastic organic polymer having a number of monovalent hydrophobic groups incorporated in the internal portion of the polymer molecule. U.S. Pat. Nos. 4,496,708 and 4,426,485, issued to Union Carbide Corporation, describe such thickeners as water-soluble comb polymers containing a number of pendant internal hydrophobic groups separated from the uncapped end of the polymer by polyether Units.

A number of patents issued to BASF Corporation describe a family of polyether liquid thickeners for aqueous liquids obtained by capping a straight-chain polyoxyalkylene compound derived from ethylene oxide and an alcohol with at least one other lower alkylene oxide, e.g., a poloxyalkylene compound initiated with an active hydrogen-containing initiator and with an alpha-olefin oxide group. See U.S. Pat. Nos. 4,288,639, 4,354,956 and 4,904,466.

Cross linked polyesters, polyester-urethanes and polyether-alpha olefins as well as a variety of other types of polymers have also been used as synthetic thickeners. See, for example, U.S. Pat. Nos. 4,310,436 and 4,709,099 issued to BASF Corporation.

The above-described rheological additives, useful in aqueous systems, have been often referred to by the term "associative" thickeners. Associative thickeners are so called because the mechanism by which they thicken may involve hydrophobic associations between the hydrophobic species in the thickener molecules and other hydrophobic surfaces, either on other thickener molecules, or on molecules in the system to be thickened. The different types of associative thickeners include, but are not limited to, polyurethanes, hydrophobically-modified alkali soluble emulsions, hydrophobically modified hydroxyethyl cellulose or other products, and hydrophobically modified polyacrylamides.

The molecular weight and HLB of these associative thickeners, which usually are water soluble or dispersible polymers, is chosen to be sufficiently high to impart desired rheological properties to an aqueous composition containing the thickener. Advantageously, the water-soluble polymer has a molecular weight sufficiently high such that a solution containing up to 2–3 weight percent of this polymer will exhibit a viscosity of at least 5,000, preferably at least 15,000, and most preferably at least 20,000 centipoises (as measured on a Brookfield viscometer with a number 3 spindle at 10 RPM at 25° C.). As explained above, a variety of polymeric materials may be used as a water-soluble polymer, including cellulose ethers, polyacrylamides, sulfonated polystyrenes, copolymers of acrylic acid, hydroxypropylated guar, and the like. The choice of the particular water-soluble polymer depends primarily on the compatibility of such polymer with the other components of the thickened system that contains the thickener, and the ultimate end use of the aqueous system.

Levels of the rheological thickening additive varying between 0.1% and about 10%, based on the total weight of the system to be thickened, have been found to be useful. As a general class, associative thickeners provide a combination of properties not found in any other single class of known thickeners. For example, they are generally nonionic, and in many cases are highly efficient viscosity improvers even though they can have middle range molecular weight. They are usually stable to water and are not sensitive to biodegradation. Associative thickeners can be further classified as molecules containing hydrophobic moieties, whether localized or dispersed throughout a hydrophilic backbone. The hydrophobic parts cause the association, either with themselves or by association with hydrophobic moieties contained in the various ingredients commonly found in aqueous paints. Typical backbones would include polyurethanes, polyethers and starch-type molecules. They are versatile in that not only do they thicken virtually unlimited types of aqueous systems, but they also impart many beneficial auxiliary properties. Thus, as additives to textile binder compositions, they actually soften rather than harden the fabric. In latex paints, especially, they not only thicken but in many cases also provide superior flow and leveling, and give excellent viscosity control under both low and high shear conditions.

Water-soluble thickeners for aqueous systems are often prepared and have been used as thickeners in a dry, solid form. Problems associated with the use of solid polymers however include poor dispersibility when added to aqueous systems, and undesirably long dissolution times. In addition, the dust associated with the incorporation of dry polymers presents similar conventional handling problems as are encountered with other types of particulate materials. Water-soluble solid polymers can be hygroscopic, and can absorb water from the air, which can cause agglomeration of the particles. Such particles are then difficult to disperse in an aqueous system. When added to aqueous systems, solid, water-soluble polymers by their nature tend to agglomerate to form clumps. Agglomeration can be reduced in many cases by adding the solid polymer to the aqueous system slowly with agitation. Such slow dissolution, however, can affect the efficiency of specific manufacturing operations.

Solid water-soluble polymers are also known to be difficult to handle in industrial processes because they require long periods of time to dissolve. Both in simple aqueous solution and, more particularly, in formulations comprising other chemicals and ingredients, extended agitation and aging periods are required before proper incorporation is attained. When polymers are furnished as concentrated, nearly solid solutions, they are difficult to dilute uniformly, so as to avoid the production of local areas of high concentration. This requires users and formulators to develop crude empirical methods for estimating the final rheological properties of the formulations, and to inventory excess amounts of polymer for reprocessing if the final rheological properties of the original compositions do not meet the specific required specifications.

For the above reasons, manufacturers have searched for and insisted on a fast, effective and simple way of incorporating water-soluble polymers into aqueous systems. Because of this, most commercial associative thickeners are today sold as pourable liquids. Such commercial rheological additives in liquid form for latex paint and other compositions usually involve preparing the thickening composition as a mixture of water and a water miscible organic solvent, such as diethylene glycol monobutyl ether (also known as butyl Carbitol TM) or ethylene or propylene glycol, into which the associative thickener is mixed. The main reason for the addition of this organic cosolvent is to lower the viscosity of these polymers in water to provide ease in handling and allow a practical level of activity in the final product. Typically, the viscosity of the thickening composition should be less than 15,000 cP (at 10 RPM), at 25° C. so that it will readily drain from the storage container, be pourable, and rapidly incorporate into the composition to be thickened at room temperature. The water miscible solvent selected for such commercial compositions has, up to this time, exclusively been an organic solvent.

The use of a volatile organic cosolvent contributes to the Volatile Organic Content, designated VOC, of the aqueous system that was thickened. The reduction of the VOC of water-borne systems, including important paint and construction systems, without adversely affecting the other properties of the systems, is currently a very active research topic throughout the world, but most particularly in the United States. Although rheological additives are used at relatively low levels in paints, they contribute to the total paint VOC, because they are typically sold in the aforesaid organic solvent/water mixtures. For example, commercial polymeric theological additives for water-borne paint systems, designated RHEOX RHEOLATE 255, 278, and 300, are currently sold as liquids in a thickener/butyl carbitol/water mixture. The butyl carbitol is an organic solvent added to among other things lower the viscosity of the water soluble polymers in water, and thus allow a practical level of activity in the final product. The aforementioned Union Carbide patent, U.S. Pat. No. 4,426,485 also describes a solvent/water mixture for a polymer thickening composition of appropriate amounts of polymer, the organic solvent diethylene glycol monobutyl ether, and water. This organic solvent as well as other glycols present evaporate after paints and coatings containing such chemicals are applied, and enter the atmosphere during the drying of the aqueous composition. Similar evaporation occurs following the application of joint compounds or cosmetics, among other thickened substances.

The removal of organic vapors released in the course of various industrial and architectural painting and, for example, in the manufacture of painted and coated articles such as automobiles and furniture, has become increasingly important in combating atmospheric pollution. Such organic vapors not only have an offensive odor, but they may also cause damage to vegetation, wildlife and other aspects of the external environment, besides constituting a health hazard. The authorities in many countries, including the United States and Western Europe, have increasingly imposed lower and lower tolerances as to such gases being vented to the atmosphere, and it could become imperative in many countries to remove virtually all such volatile organics, under the penalty of an absolute ban on continuing operation of the impacted business activity. By law passed in 1990, California has forbidden the sale or manufacture of any architectural coating which contains more than a set amount of volatile organic compounds per liter.

The prior art in general does not appear to have recognized the importance of reducing or eliminating volatile components in thickening compositions. A thickening composition having little or no VOC will contribute little or zero VOC to the aqueous system being thickened.

The patent specification of U.S. Pat. No. 5,137,571 recently issued to Rohm & Haas Corp., does exhibit some understanding of the environmental problems which associative thickening compositions can cause. In an effort to eliminate the need for organic cosolvents, the patent describes the use of cyclodextrin compounds and their hydroxyethyl—or hydroxypropyl—derivatives to suppress the viscosity of an associative thickener in water. It has been proposed that the cyclodextrin compounds are absorbed onto the hydrophobic moieties of associative thickeners. A 1993 abstract of work done at North Dakota State University by Glass shows further work on cyclodextrin complexed with surfactants.

Japanese Patent Disclosure 60-49022 discloses that a large list of various chemical additives may, depending on the intended use, be added to associative thickeners, which list includes surfactants, but with no teaching that the use of such materials with water can reduce volatiles, replace organic solvents, or affect the viscosity of the associative thickener in water. U.S. Pat. No. 4,722,962, issued to DeSoto Inc., refers to nonionic surfactants in relation to associative thickeners, but teaches reacting such surfactants into the thickener polymer to form a portion of the final polyurethane. No understanding of any problem relating to organic pollution is demonstrated.

A 1989 Akzo Chemical brochure for commercial products designated Dapral T210 and Dapral T212 describes these products as thickeners for latex formulations, surfactants formulations, water/glycol mixtures and oil-in-water emulsions. Since the two Akzo thickeners are not soluble in water in all proportions, the brochure describes the use of surfactant/thickener premixes as a way of effecting the behavior in aqueous systems of the thickeners. There is again no discussion or understanding of the importance of reducing organic volatile emissions.

Object of the Invention

Accordingly, it is a general object of the present invention to solve or substantially alleviate the problems created by the presence of volatile organic solvents in thickening compositions for aqueous systems. It is, therefore, a more specific object of the present invention to provide a liquid, water dispersible thickening composition of less than 15,000 cP at 25° C. which is useful for increasing the viscosity of a water-based system in an improved and efficient manner without the environmental problems associated with the current organic solvent-containing products.

It is another object of the present invention to provide a thickening composition containing an associative thickener, water, and either of, or a mixture of both, an anionic or nonionic surfactant whose presence will significantly lower the aqueous viscosity of the associative thickener composition and also reduce the total VOC of the thickening composition.

DETAILED DESCRIPTION OF THE INVENTION

The pourable, water dispersible thickening composition of this invention is a mixture in specified amounts of:
- (a) A thickening compound including but not limited to, for example, a polyurethane associative thickener;
- (b) water; and
- (c) one or more anionic surfactants or one or more non-ionic surfactants, or a mixture thereof.

The relative amounts of each of the above chemicals in the thickening composition can vary over wide ranges, with an effective range of about 15–40% thickening compound, 30–85% water, and 1–30% surfactant. It is also to be understood that additional additives may also be added to the thickening composition, including organic solvents of the type found in the prior art, in diminished amounts as compared to those presently commonly used. Other ingredients known in the art that may be added to thickening compositions would include inorganic salts, binders, chelating agents, buffering agents, clays, pH adjusting agents, neutralization chemicals, and the like.

The type of surfactants preferably utilized in this invention are anionic and non-ionic surfactants as described below:
- A. Anionic surfactants, like surfactants in general, are characterized by an amphipathic molecular structure composed of groups of opposing solubility tendencies, typically an oil-soluble hydrocarbon chain and a water-soluble ionic group. The presence of two structurally dissimilar groups within a single molecule is the most fundamental characteristic of anionic and other surfactants.

The surface behavior, i.e. the surface activity, of the surfactant molecule is determined by the make-up of the individual groups, the solubility properties, their relative size, and their location within the surfactant molecule.

Anionic surfactants useful in this invention are characterized by having carboxylates, sulfonates, sulfates, or phosphates as their hydrophilic, solubilizing group. These groups are preferably combined with a carbon-chain hydrophobe (8–16 carbons is most common) for best surfactant properties. Of the counterions associated with these polar groups, sodium and potassium impart water solubility, whereas calcium, barium, and magnesium promote oil solubility. Ammonium and substituted ammonium ions provide both water and oil solubility.

Surfactant solutions further exhibit combinations of defoaming, emulsifying, wetting, solubilizing, and dispersing properties which can provide rheological properties in harmony with the associative thickener used.

Representative anionic surfactants for use with associative thickeners in the invention include: dialkyl sulfosuccinates such as Aerosol OT, Monawet MO-85P, and Emcol 4500; alkyl sulfates such as Witcolate D5-10, Stepanol WA-100, and Avirol SL-1000; alpha olefin sulfonates such as Bio-Terge AS-40, Bio-Terge AS-90A, and Witconate AOS; and sulfates of ethoxylated alcohols such as Aviron 252-S, Polystep B-12, and Witcolate SE-5.

Anonic surfactants tend to form aggregates of molecules or ions called micelles when the concentration of the surfactant solute in the bulk of the solution exceeds a limiting value, the so-called critical micelle concentration (CMC), which is a fundamental characteristic of each solute-solvent system.

Hydrophilic, solubilizing groups for various anionic surfactants useful in the compositions of the invention include the previously mentioned carboxylates, sulfonates, sulfates, and phosphates contained in a particular anionic surfactants.

B. Nonionic surfactants carry no discrete charge when dissolved in aqueous media. The solubilizing groups in this type of surfactant are usually ethylene oxide chains and hydroxyl groups. Hydrophilicity in nonionic surfactants is provided by hydrogen bonding with water molecules. Oxygen atoms and hydroxyl groups readily form strong hydrogen bonds, whereas ester and amide groups form hydrogen bonds less readily. Hydrogen bonding provides solubilization in neutral and alkaline media. In a strongly acid environment, oxygen atoms are protonated, providing a quasi-cationic character. Each oxygen atom makes a small contribution to water solubility. More than a single oxygen atom is therefore needed to solubilize a nonionic surfactant in water. Nonionic surfactants are compatible with ionic and amphoteric surfactants. Since a polyoxyethylene group can easily be introduced by reaction of ethylene oxide with any organic molecule containing an active hydrogen atom, a wide variety of structures can be solubilized by ethoxylation. Hence, many anionic and nonionic surfactants contain polyoxyethylene groups.

Particularly effective nonionic surfactants usable in the present invention include: ethoxylated alkyl phenols such as Igepal CO-887, Triton X-100, and Triton X-114; ethoxylated alcohols such as Brij 30, Brij 35, and Tergitol 15-S-12; and polyglycols such as Rhodasurf E-300 and Rhodasurf E-600.

C. Mixtures or combinations of ionic and nonionic surfactants can be employed in the invention, particularly if used in combination with lower molecular weight, water-soluble polymers. The relative amounts of each respective surfactant should be left to the skilled artisan's judgement, based in part on the properties necessary in the aqueous system involved.

The thickening composition of the present invention is prepared most preferably by adding the thickening polymer to a mixture of water and the described surfactants. While the relative amounts may vary, in general, water will normally make up more than 50% of the amount of the thickening composition. The relative amounts of polymer, water and surfactant can effectively vary in a wide ranges in producing thickeners according to the invention. A preferred range for the relative amounts is about 15-40% associative thickener polymer, 30-85% water, and 1-30% surfactant.

The mixture of the above chemicals can be accomplished utilizing machinery presently used to prepare existing thickening compositions containing organic cosolvents. While the thickening composition should be pourable and liquid, solid polymers and solid surfactants can often be utilized, with the water providing a liquid base. It may be possible to eliminate, or reduce the need for, presently required apparatus the function of which is to carry away or treat volatile gases released during manufacture.

Use of the thickening composition of the invention is similar to the use of present, commercial, thickening compositions, and should in general require no special arrangements or apparatus when incorporating such compositions into aqueous systems. Typically use levels are 0.25% to 10% of the thickening composition, the percent being based on the system to be thickened. The thickening composition can be mixed into the aqueous system using conventional mixing equipment such as sand mills, medium and high speed dispersing apparatus, paddle mixers, pebble mills, ball mills, and similar such mixture apparatus.

The proposed mechanism of thickening for associative thickeners in aqueous solutions is through physical interactions or associations between the hydrophobic moieties of the thickener molecules. These associations create a three dimensional network of thickener molecules that results in a very high aqueous viscosity. The addition of surfactant allows the hydrophobic moiety of the surfactant molecules to interact with the hydrophobic moieties of the thickener molecules and effectively break down this network resulting in a much lower aqueous viscosity. When added to a paint formula, the combination of high shear and the other ingredients of the formula allow for the surfactant to be desorbed from the thickener molecule; the thickener molecule can now associate with the other hydrophobic moieties of the paint formula and thicken in the usual way.

The thickening composition of the invention is preferably added to an aqueous system to be thickened thereby in an amount of up to 10% by weight of said system. The specific amount utilized will depend on a variety of factors within the knowledge of skilled artisans in the particular field wherein the aqueous system is utilized.

The following examples are illustrations designed to assist those skilled in the art to practice the present invention,but are not intended to limit the invention. Changes can be made without departing from the spirit of the invention. The various chemicals used in the examples are commercial materials.

EXAMPLES

Preparing an Associative Thickener Composition with Various Surfactant/Water Mixtures

Example I (Comparative Example)

For comparison sake, this example demonstrates the effectiveness of an organic cosolvent such as butyl carbitol to lower the aqueous viscosity of polyurethane and non-polyurethane associative thickeners. A polyetherpolyol associative thickener, Pluraflo AT-301, made by BASF, and two polyurethane associative thickeners, RHEOLATE 205 and 208, from RHEOX, Inc., were used; these three polymer products are 100% active. Both the aqueous and solvent-containing solutions were prepared in the following way: the water or solvent-/water solutions were heated to 70° C. and the polymer samples were added with mixing, further heating and mixing were done until a homogeneous solution was prepared. After standing overnight the viscosity of the solutions was measured using a Brookfield viscometer using either spindle number 3 or 7 at 10 rpm at 25° C. The viscosities are presented in Table 1.

TABLE 1

| Sample | Composition | Viscosity (cP) |
|---|---|---|
| 1 | 15% Pluraflo AT-301/85% Water | 624,000 |
| 2 | 32% AT-301/12.5% Butyl Carbitol/ | 3,650 |

TABLE 1-continued

| Sample | Composition | Viscosity (cP) |
|---|---|---|
| | 55.5% Water | |
| 3 | 10% RHEOLATE 205/90% Water | 354,000 |
| 4 | 25% RHEOLATE 205/15% Butyl Carbitol/ 60% Water | 8,200 |
| 5 | 20% RHEOLATE 208/80% Water | 296,000 |
| 6 | 25% RHEOLATE 208/15% Butyl Carbitol/ 60% Water | 3,700 |

These results show that the aqueous viscosity of the associative thickeners can be appreciatively lowered through the addition of an organic cosolvent.

Example 2

This example demonstrates the effectiveness of surfactants of the present invention to lower the aqueous viscosity of a polyether/polyol thickener, Pluraflo AT-301 from BASF. The polymer/surfactant/water solutions were prepared as the samples in Example 1: the surfactant/water solutions were heated to 70° C., the Pluraflo AT-301, a viscous liquid at room temperature, was also heated to 70° C. and added to the surfactant/water solutions with mixing, further heating and mixing were done until a homogenous solution was achieved. Viscosities were measured as in Example 1. The results are given in Table 2; the water and water/butyl carbitol results are included for comparison purposes.

TABLE 2

| Sample | Composition | Viscosity (cP) |
|---|---|---|
| 7 | 32% AT-301/6.5% Aerosol OT-100*/ 61.5% Water | 4,100 |
| 8 | 25% AT-301/20% Triton X-100/ 55% Water | 4,350 |
| 9 | 32% AT-301/6.0% Basophen RA/ 62% Water | 4,500 |
| 10 | 32% AT-301/10% Gemtex 691-40/ 58% Water | 4,900 |
| 11 | 43% AT-301/7.5% Gemtex 680/ 60.5% Water | 3,850 |
| 12 | 32% AT-301/6.5% Monowet MO-85P/ 61.5% Water | 3,600 |
| 13 | 32% AT-301/5% Surfynol CT-111/ 63% Water | 6,200 |
| 14 | 32% AT-301/12.5% Butyl Carbitol/ 55.5% Water | 3,650 |
| 15 | 15% Pluraflo AT-301/85% Water | 624,000 |

*Aerosol AT-100; Dioctyl sodium sulfosuccinate; CYTEC, Inc.
Triton X-100; Octylphenoxypolyethoxyethanol nonionic surfactant; Union Carbide
Basophen RA; Anionic surfactant; BASF, Inc.
Gemtex 691-40; Sodium dicyclohexyl sulfosuccinate; Finetex, Inc.
Gemtex 680; Proprietary anionic surfactant; Finetex, Inc.
Monawet MO-85P; Sodium dioctyl sulfosuccinate; Mona Industries, Inc.
Surfynol CT-111; Proprietary acetylenic surfactant; Air Products and Chemicals, Inc.

These results demonstrate that, through the addition of an appropriate amount of surfactant, the aqueous viscosity of the non-polyurethane associative thickener can be lowered to levels approaching that of the sample containing the cosolvent. Example 3

This example is used to show the effectiveness of surfactants to lower the aqueous viscosity of a polyurethane associative thickener, RHEOLATE 208 from RHEOX, Inc. Samples were prepared according to Example 2 with the exception that the RHEOLATE 208 was not heated to 70° C. before addition to the surfactant/water solution because its physical state is a fine white powder. Viscosity results are reported in Table 3.

TABLE 3

| Sample | Composition | Viscosity (cP) |
|---|---|---|
| 16 | 25% RHEOLATE 208/10% Witcolate D5-10*/65% Water | 3,200 |
| 17 | 25% RHEOLATE 208/10% Aerosol AY-100 65% Water | 4,000 |
| 18 | 25% RHEOLATE 208/10% Aerosol MA-80/ 65% Water | 3,600 |
| 19 | 25% RHEOLATE 208/10% Gemtex 691-40/ 65% Water | 7,200 |
| 20 | 25% RHEOLATE 208/10% Gemtex 680/ 65% Water | 3,600 |
| 21 | 25% RHEOLATE 208/10% Bio-Terge PAS-8S/65% Water | 6,800 |
| 22 | 25% RHEOLATE 208/15% Butyl Carbitol/ 60% Water | 3,700 |
| 23 | 20% RHEOLATE 208/80% Water | 296,000 |

*Witcolate D5-10; Sodium salt of 2-ethyl hexyl sulfate; Witco, Inc.
Aerosol AY-100; Sodium diamyl sulfosuccinate; CYTEC, Inc.
Aerosol MA-80; Sodium di(1,3-dimethylbutyl) sulfosuccinate; CYTEC, Inc.
Bio-Terge PAS-8S; Primary alkane sulfonate; Stepan Co.

These results show that the aqueous viscosity of a typical polyurethane associative thickener can be lowered to levels of 8000 cP and below through the addition of surfactant.

Example 4

The total volatile content of a coating can be determined according to ASTM Method D2369-90. This test method involves weighing a known quantity of coating specimen into an aluminum foil dish, heating for 60 min. in a forced-draft oven at 110° C., and calculating the percent volatile from the loss in weight. Although ASTM Method D2369-90 is for coating compositions, this method was used to determine the total volatile content of the polymer/surfactant/water solutions. Because some of the surfactants used contained small amounts of volatile organic solvents, the total volatile organic content of the polymer/surfactant/water solutions was calculated based on the actual amount of surfactant solution added to the mixture. The total volatile content and the volatile organic contents are reported below in Table 4 for the Pluraflo AT-301 thickener; results for the RHEOLATE 208 thickener appear in Table 5.

TABLE 4

| Sample | Composition | Total Volatile Content | Total VOC |
|---|---|---|---|
| 24 | 32% AT-301/6.5% Aerosol OT-100/61.5% Water | 61.83% | 0.00% |
| 25 | 25% AT-301/20% Triton X-100/ 55% Water | 53.50% | 0.60% |
| 26 | 32% AT-301/6.0% Basophen RA/ 62% Water | 62.04% | 0.54% |
| 27 | 32% AT-301/10% Gemtex 691-40/ 58% Water | 58.59% | 0.00% |
| 28 | 32% AT-301/7.5% Gemtex 690/ 60.5% Water | 60.93 | 0.18% |
| 29 | 32% AT-301/6.5% Monawet MO-85P/61.5% Water | 61.35% | 0.00% |
| 30 | 32% AT-301/5% Surfynol CT-111/ 63% Water | 62.30% | 0.00% |
| 31 | 32% AT-301/12.5% Butyl Carbitol/55.5% Water | 67.61% | 12.50% |
| 32 | 15% Pluraflo AT-301/85% Water | 84.67% | 0.00% |

TABLE 5

| Sample | Composition | Total Volatile Content | Total VOC |
|---|---|---|---|
| 33 | 25% RHEOLATE 208/10% Witcolate D5-10 65% Water | 65.69% | 0.34% |
| 34 | 25% RHEOLATE 208/10% Aerosol AY-100/65% Water | 65.52 | 0.00% |
| 35 | 25% RHEOLATE 208/10% Aerosol MA-80/65% Water | 64.88% | 0.74% |
| 36 | 25% RHEOLATE 208/10% Gemtex 691-40/65% Water | 65.55% | 0.00% |
| 37 | 25% RHEOLATE 208/10% Gemtex 680/65% Water | 65.16% | 0.26% |
| 38 | 25% RHEOLATE 208/10% Bio-Terge PAS-8S/65% Water | 64.74% | 1.23% |
| 39 | 25% RHEOLATE 208/15% Butyl Carbitol/60% Water | 74.95% | 15.00% |
| 40 | 20% RHEOLATE 208/80% Water | 80.55% | 0.00% |

Both of these Tables demonstrate that through the addition of an appropriate surfactant the total VOC of the thickening composition can be brought down to low levels or zero.

Example 5

Associative thickeners are commonly used to thicken water-based latex paint formulations. For most applications, latex paint formulations typically have a low shear or Stormer viscosity of 80 KU or higher and a high shear or ICI viscosity of 0.5 P or higher. This example is to demonstrate the use of surfactant and modified non-polyurethane associative thickener in latex paint, the formulation of which is given below in Table 6.

TABLE 6

| Latex Paint Formulation No. 1 | |
|---|---|
| Ingredient | Pounds |
| Water | 152.4 |
| Nuosept C (biocide) | 1.0 |
| Tamol 731 (25%; dispersant) | 12.0 |
| Kronos 2131 (Titanium dioxide) | 209.0 |
| Optiwhite (China Clay) | 75.0 |
| Microwhite 25 (Calcium carbonate) | 35.0 |
| *Disperse at high speed for 15 min.* | |
| UCAR 376 (Vinyl acrylic latex) | 350.0 |
| Triton N-57 (Surfactant) | 2.0 |
| Texanol | 9.0 |
| Propylene glycol | 40.0 |
| Colloid 643 (defoamer) | 4.0 |
| Ammonium hydroxide (28%) | 4.0 |
| Thickener plus water | 186.6 |

Thickener dry weight: 9.3 lbs/100 gal.

The Stormer and ICI viscosities for the Pluraflo AT-301 dispersed in the above paint formula are presented below.

TABLE 7

| Sample | Composition | Viscosity KU/ICI |
|---|---|---|
| 41 | 32% AT-301/6.5% Aerosol OT-100/61.5% Water | 94/1.5 |
| 42 | 25% AT-301/20% Triton X-100/55% Water | 97/2.2 |
| 43 | 32% AT-301/6.0% Basophen RA/62% Water | 93/1.5 |
| 44 | 32% AT-301/10% Gemtex 691-40/58% Water | 86/1.5 |
| 45 | 32% AT-301/7.5% Gemtex 680/60.5% Water | 88/1.6 |
| 46 | 32% AT-301/6.5% Monawet MO-85P/61.5% Water | 96/1.6 |
| 47 | 32% AT-301/5% Surfynol CT-111/ | 90/1.6 |

TABLE 7-continued

| Sample | Composition | Viscosity KU/ICI |
|---|---|---|
| 48 | 63% Water 32% AT-301/12.5% Butyl Carbitol; 55.5% Water | 90/1.6 |

This example demonstrates the effectiveness of replacing the butyl Carbitol ™ cosolvent with a surfactant composition. In most cases, the presence of the surfactant enhanced the Stormer viscosity (or KU) when compared to sample 48. With sample 42, the use of the Triton X-100 nonionic surfactant resulted in both an increased Stormer and markedly higher ICI viscosity (high shear viscosity).

Example 6

This example demonstrates the ability of surfactant modified polyurethane associative thickeners to thicken latex paints. The paint formula is given Table 8.

TABLE 8

| Latex Paint Formulation No. 2 | |
|---|---|
| Ingredients | Pounds |
| Propylene glycol | 29.92 |
| Tamol 681 (35%; dispersant) | 29.92 |
| Ammonium hydroxide (28%) | 0.83 |
| Foamaster AP (defoamer) | 1.66 |
| Water | 10.39 |
| Kronos 2310 (Titanium dioxide) | 213.56 |
| Water | 10.30 |
| *Disperse at high speed for 15 min.* | |
| Butyl Carbitol | 34.90 |
| Rhoplex HG-74 (Acrylic latex) | 558.42 |
| Texanol | 34.90 |
| Foamaster AP | 1.66 |
| Ammonium hydroxide (28%) | 1.25 |
| Thickener plus water | 82.27 |

Thickener dry weight: 10.8 lb/100 gal.

The Stormer and ICI viscosities are reported in Table 9.

TABLE 9

| Sample | Composition | Viscosity KU/ICI |
|---|---|---|
| 49 | 25% RHEOLATE 208/10% Witcolate D5-10/65% Water | 79/1.0 |
| 50 | 25% RHEOLATE 208/10% Aerosol AY-100/65% Water | 82/1.1 |
| 51 | 25% RHEOLATE 208/10% Aerosol MA-80/65% Water | 80/1.1 |
| 52 | 25% RHEOLATE 208/10% Gemtex 691-40/65% Water | 85/1.2 |
| 53 | 25% RHEOLATE 208/10% Gemtex 680/65% Water | 80/1.0 |
| 54 | 25% RHEOLATE 208/10% Bio-Terge PAS-8S/65% Water | 82/1.0 |
| 55 | 25% RHEOLATE 208/15% Butyl Carbitol/60% Water | 84/1.1 |

The above results demonstrate the ability of various surfactants to be used in associative thickening compositions for water-based latex paints. The above described results shown in the examples clearly demonstrate that the inventive surfactant solutions can be used to provide low VOC additives, even when the associative thickeners are based on very different types of chemistry.

We claim:

1. A pourable at 25° C. water dispersible associative thickener composition with diminished volatile organic content for aqueous systems comprising:
   (a) from about 15 to 40% by weight of an associative thickener polymer;
   (b) from about 30 to 85% water, and
   (c) from about 1 to 30% of one or more surfactants selected from the group consisting of anionic and nonionic surfactants.

2. The composition of claim 1 wherein the associative thickener polymer is selected from the group consisting of polyurethanes, polyesters, modified cellulosics, polyesterurethanes, polyether-alpha olefins and polyetherpolyols.

3. The composition of claim 1 wherein the associative thickener polymer is a polyurethane characterized by hydrophobic groups interconnected by hydrophilic groups and having a molecular weight of 2500 grams/mole or greater.

4. The composition of claim 1 wherein the associative thickener is a polyoxyalkylene compound initiated with an active hydrogen-containing initiator and capped with an alpha-olefin oxide group.

5. The composition of claim 1, wherein the amount of surfactant in the composition is greater than 2%.

6. The composition of claim 1, wherein the nonionic surfactant is selected from the group consisting of ethoxylated alkyl phenols, ethoxylated alcohols and polyglycols.

7. The composition of claim 1, comprising one or more additional components selected from the group consisting of binders, clays, neutralization chemicals and buffering agents.

8. An improved method of increasing the viscosity and leveling characteristics of an aqueous system comprising mixing the aqueous system with from about 0.25% to about 10% by weight of a pourable water dispersible associative thickener composition with reduced volatile organic content comprising:
   (a) from about 15 to 40% by weight of an associative thickener polymer;
   (b) from about 30 to 85% water, and
   (c) from about 1 to 30% of one or more surfactants selected from the group consisting of anionic and nonionic surfactants.

9. The method of claim 8 wherein the aqueous system is latex paint.

10. The method of claim 8 wherein the associative thickener polymer is a polyurethane.

11. The method of claim 8 wherein the associative thickener polymer is a polyoxyalkylene compound initiated with an active hydrogen-containing initiator and capped with alpha-olefine oxide groups.

12. The method of claim 8 wherein the anionic surfactant is selected from the group consisting of dialkyl sulfosuccinates, alkyl sulfates, alpha olefin sulfonates and sulfates of ethoxylated alcohols.

* * * * *

REEXAMINATION CERTIFICATE (3250th)
United States Patent [19]
Doolan et al.

[11] B1 5,425,806
[45] Certificate Issued Jul. 1, 1997

[54] POURABLE WATER DISPERSIBLE THICKENING COMPOSITION FOR AQUEOUS SYSTEMS AND A METHOD OF THICKENING SAID AQUEOUS SYSTEMS

[75] Inventors: Joseph G. Doolan, Hightstown; Charles A. Cody, Robbinsville, both of N.J.

[73] Assignee: Rheox, Inc., Hightstown, N.J.

Reexamination Request:
No. 90/004,521, Jan. 15, 1997

Reexamination Certificate for:
Patent No.: 5,425,806
Issued: Jun. 20, 1995
Appl. No.: 242,747
Filed: May 12, 1994

[51] Int. Cl.$^6$ ............................ C09D 7/12; C09D 101/28
[52] U.S. Cl. ..................... 106/203.1; 106/193.1; 106/194.2; 106/203.2; 524/1; 524/117; 524/156; 524/157
[58] Field of Search ................ 106/203.1, 193.1, 106/194.2, 203.2; 524/1, 117, 156, 157

[56] References Cited

U.S. PATENT DOCUMENTS

4,384,096   5/1983   Sonnabend ........................ 526/313
4,432,881   2/1984   Evani .............................. 252/8.5 A

FOREIGN PATENT DOCUMENTS

B1-32 174/78   4/1978   Australia.
WO93/24577    12/1993   WIPO.

OTHER PUBLICATIONS

Paul R. Howard, Edward L. Leasure, Stephen T. Rosier, and Edward J. Schaller; *Formulating with Combinations of HEUR Associative Thickeners*, Journal of Coating Technology, vol. 64 (Jan. 1992) No. 804, pp. 87–94.

Toshio Murakami, R.H. Fernando, and J.E. Glass; *The influence of hydrophobivally–modified, alkali–swellable emulsions on the rheology of pigmented coatings*, Surface Coatings International (Jan. 1993), vol. 76, No. 1, pp. 8–14.

Edward J. Schaller; *Rheology Modifiers For Water–Borne Paints*, Surface Coatings Australia (Oct. 1985), vol. 22, No. 10, pp. 6–13.

*Primary Examiner*—David M. Brunsman

[57] ABSTRACT

A pourable liquid thickening composition for aqeuous systems including latex coatings is described. The composition comprises in specified ratios an associative thickener polymer, water and one or more surfactants. Associate thickener polymers include polyurethanes, polyesters, polyacrylamides, modified hydroxyethyl celluloses, alkali soluble emulsions and other chemicals. Specific surfactants include dialkyl sulfosuccinates, alkyl sulfates, alpha olefin sulfonates and sulfates of ethoxylated alcohols.

B1 5,425,806

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 8 are determined to be patentable as amended.

Claims 3–7 and 9–12, dependent on an amended claim, are determined to be patentable.

1. A pourable at 25° C. water dispersible associative thickener composition with diminished volatile organic content for aqueous systems comprising:
   (a) from about 15 to 40% by weight of an associative thickener polymer *selected from the group consisting of polyurethanes, polyesters, modified cellulosics, polyesterurethanes, polyetheralpha olefins and polyetherpolyols*;
   (b) from about 30 to 85% water, and
   (c) from about 1 to 30% of one or more surfactants selected from the group consisting of anionic and nonionic surfactants.

8. An improved method of increasing the viscosity and leveling characteristics of an aqueous system comprising mixing the aqueous system with from about 0.25% to about 10% by weight of a pourable water dispersible associative thickener composition with reduced volatile organic content comprising:
   (a) from about 15 to 40% by weight of an associative thickener polymer *selected from the group consisting of polyurethanes, polyesters, modified cellulosics, polyesterurethanes, polyetheralpha olefins and polyetherpolyols*;
   (b) from about 30 to 85% water, and
   (c) from about 1 to 30% of one or more surfactants selected from the group consisting of anionic and nonionic surfactants.

* * * * *